US010606128B2

(12) United States Patent
Kwon et al.

(10) Patent No.: US 10,606,128 B2
(45) Date of Patent: Mar. 31, 2020

(54) METHOD FOR PREPARING PHOTOALIGNMENT LAYER

(71) Applicant: LG CHEM, LTD., Seoul (KR)

(72) Inventors: Soon Ho Kwon, Daejeon (KR); Hee Han, Daejeon (KR); Jung Ho Jo, Daejeon (KR); Hang Ah Park, Daejeon (KR); Jun Young Yoon, Daejeon (KR); Hyeong Seuk Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 263 days.

(21) Appl. No.: 15/743,958

(22) PCT Filed: Sep. 6, 2016

(86) PCT No.: PCT/KR2016/009976
§ 371 (c)(1),
(2) Date: Jan. 11, 2018

(87) PCT Pub. No.: WO2017/057854
PCT Pub. Date: Apr. 6, 2017

(65) Prior Publication Data
US 2018/0231845 A1 Aug. 16, 2018

(30) Foreign Application Priority Data

Oct. 2, 2015 (KR) .................. 10-2015-0139193
Sep. 5, 2016 (KR) .................. 10-2016-0113988

(51) Int. Cl.
G02F 1/1337 (2006.01)
C09K 19/54 (2006.01)
C08L 79/08 (2006.01)
C09K 19/56 (2006.01)
C09D 179/08 (2006.01)
C08G 73/10 (2006.01)

(52) U.S. Cl.
CPC ... G02F 1/133723 (2013.01); C08G 73/1078 (2013.01); C08L 79/08 (2013.01); C09D 179/08 (2013.01); C09K 19/542 (2013.01); C09K 19/56 (2013.01); C08L 2203/20 (2013.01); C09K 2019/548 (2013.01); G02F 1/133788 (2013.01)

(58) Field of Classification Search
CPC ......... G02F 1/133723; G02F 1/133788; C08G 73/1078; C08L 79/08; C08D 179/08
USPC ........................................... 430/321; 349/124
See application file for complete search history.

(56) References Cited

U.S. PATENT DOCUMENTS

| 5,807,498 | A | 9/1998 | Gibbons et al. |
| 5,958,293 | A | 9/1999 | Gibbons et al. |
| 5,965,691 | A | 10/1999 | Gibbons et al. |
| 6,200,655 | B1 | 3/2001 | Gibbons et al. |
| 6,312,769 | B1 | 11/2001 | Hiraoka et al. |
| 7,625,611 | B2 | 12/2009 | Kim et al. |
| 8,470,412 | B2 | 6/2013 | Shin et al. |
| 8,901,353 | B2 | 12/2014 | Nagao |
| 2015/0064366 | A1 | 3/2015 | Matsumori et al. |
| 2015/0205167 | A1* | 7/2015 | Kang ................ G02F 1/133723 349/42 |
| 2015/0241739 | A1 | 8/2015 | Park et al. |
| 2015/0268514 | A1* | 9/2015 | Seo .................. G02F 1/133788 349/43 |

FOREIGN PATENT DOCUMENTS

| CN | 104423100 A | 3/2015 |
| JP | H05-072537 A | 3/1993 |
| JP | H06-016629 A | 1/1994 |
| JP | H06-222366 A | 8/1994 |
| JP | H06-281937 A | 10/1994 |
| JP | H07-055928 B2 | 6/1995 |
| JP | H09-185064 A | 7/1997 |
| JP | 3612832 B2 | 1/2005 |
| JP | 2005-336243 A | 12/2005 |
| JP | 2013-167799 A | 8/2013 |
| KR | 10-1998-0081839 A | 11/1998 |
| KR | 10-0326522 B1 | 3/2002 |
| KR | 10-2004-0046229 A | 6/2004 |
| KR | 10-0445446 B1 | 11/2004 |
| KR | 10-2005-0049759 A | 5/2005 |
| KR | 10-0611467 B1 | 8/2006 |
| KR | 10-0792134 B1 | 1/2008 |
| KR | 10-2011-0129457 A | 12/2011 |
| KR | 10-2012-0022633 A | 3/2012 |
| KR | 10-2012-0076415 A | 7/2012 |
| KR | 10-2013-0125772 A | 11/2013 |
| KR | 10-1364841 B1 | 2/2014 |
| KR | 10-2015-0037576 A | 4/2015 |

(Continued)

OTHER PUBLICATIONS

International Search Report and Written Report issued for International Application No. PCT/KR2016/009976 dated Dec. 13, 2016 (11 pages).

Ree et al., "Synthesis, structure, and properties of high performance alternating copolyimides", Polymer Bulletin, 1995, vol. 35, pp. 129-136.

Woo et al., "Poly(amic ester-co-imides) with Different Ratios of Amic Ester and Imide Moieties: Thermally Stable Precursors for Copolyimides", Bull. Korean Chem. Soc. 1999, vol. 20, No. 2, pp. 1-3.

(Continued)

Primary Examiner — John A McPherson
(74) Attorney, Agent, or Firm — Rothwell, Figg, Ernst & Manbeck, P.C.

(57) ABSTRACT

The present invention relates to a method for preparing a photo-alignment layer. The photo-alignment layer prepared by the preparation method exhibits a high imidization ratio as well as an excellent aligning stability of liquid crystal, chemical resistance and strength, and has an excellent after-image suppressing effect by an AC driving of a liquid crystal display element.

14 Claims, 1 Drawing Sheet

(56) References Cited

FOREIGN PATENT DOCUMENTS

KR 10-2015-0101514 A 9/2015
WO WO 2014/157143 A1 * 10/2014

OTHER PUBLICATIONS

Keum et al., "Synthesis and Characterization of Aromatic Dianhydrides Containing Imide Precursor Units", Bull. Korean Chem.Soc., 1999, vol. 20, No. 5, pp. 505-507.
Neuber et al., "Combinatorial methods for the optimization of the vapor deposition of polyimide monomers and their polymerization", J. Mater. Chem., 2006, vol. 16, pp. 3466-3477.

* cited by examiner

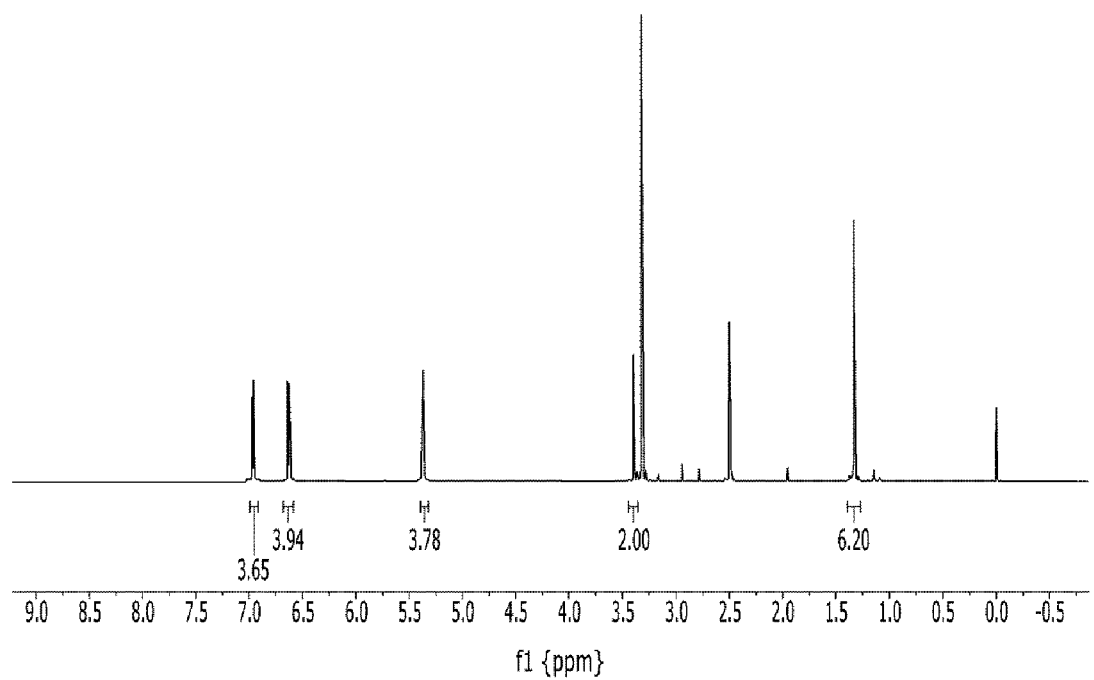

METHOD FOR PREPARING PHOTOALIGNMENT LAYER

CROSS-REFERENCE TO RELATED APPLICATION(S)

This application is a 35 U.S.C. 371 National Phase Entry Application from PCT/KR2016/009976, filed Sep. 6, 2016, which claims the benefit of Korean Patent Application No. 10-2015-0139193 filed on Oct. 2, 2015 and Korean Patent Application No. 10-2016-0113988 filed on Sep. 5, 2016, the disclosures of which are incorporated herein by reference in their entireties.

The present invention relates to a method for preparing a photo-alignment layer.

TECHNICAL FIELD

Background of Art

In a liquid crystal display element, a liquid crystal alignment layer plays a role in aligning liquid crystals in a predetermined direction. Specifically, a liquid crystal alignment layer acts as a director in the alignment of liquid crystal molecules, which serves to take an appropriate direction when forming an image by moving liquid crystals by an electric field. In general, in order to obtain a uniform luminance and a high contrast ratio in a liquid crystal display element, it is essential to uniformly align liquid crystals.

A conventional method of aligning liquid crystals includes a rubbing method wherein a polymer film such as polyimide is coated onto a surface of a substrate such as a glass substrate and the polymer film coated on the surface is rubbed in a predetermined direction with a fiber such as nylon or polyester. However, the rubbing method may generate fine dusts and electrostatic discharge (ESD) when rubbing fiber and polymer film, which may cause a serious problem when manufacturing a liquid crystal panel.

In order to solve the problems of the rubbing method, studies have been performed on a photo-alignment method where liquid crystals are aligned using anisotropy induced to the polymer film by light irradiation rather than rubbing.

As raw materials which can be used in the photo-alignment method, a wide variety of materials have been suggested, and among them, for achieving good overall performances of a liquid crystal alignment layer, polyamic acids synthesized by a reaction of a tetracarboxylic acid having a basic cyclobutane skeleton with a diamine are mainly used. However, there is a problem that the polyamic acids show a low imidization ratio and a low photosensitivity after a sintering process for forming a liquid crystal alignment layer.

DETAILED DESCRIPTION OF THE INVENTION

Technical Problem

In order to solve the above-mentioned problems, an object of the present invention is to provide a method for preparing a photo-alignment layer.

Technical Solution

According to one embodiment of the present invention, there is provided a method for preparing a photo-alignment layer, comprising the steps of preparing a polymer by reacting a diamine represented by the following Chemical Formula 1 with at least one tetracarboxylic acid or its anhydride; preparing a liquid crystal alignment agent by dissolving or dispersing said polymer in an organic solvent; and coating said liquid crystal alignment agent onto a substrate, and then subjecting to i) a sintering after an irradiation with light, or ii) a sintering during an irradiation with light, or iii) an irradiation with light after a sintering.

[Chemical Formula 1]

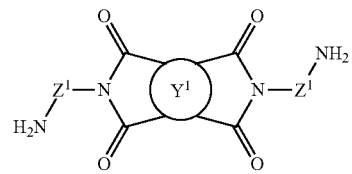

in the Chemical Formula 1, $Y^1$ is a tetravalent organic group derived from cyclic hydrocarbons having 4 to 8 carbon atoms, or a tetravalent organic group derived from compounds in which two or more of said cyclic hydrocarbons are linked by a single bond, —O—, —CR$^1$R$^2$—, —CO—, —CONH—, —COO—, —S—, —SO$_2$— or a combination thereof, or a tetravalent organic group in which one or more hydrogens in said tetravalent organic group are substituted with an alkyl group having 1 to 3 carbon atoms, with a proviso that $Y^1$ is not a tetravalent organic group derived from unsubstituted cyclobutane, wherein $R^1$ and $R^2$ is each independently hydrogen, an alkyl group having 1 to 10 carbon atoms, or a fluoroalkyl group having 1 to 10 carbon atoms, each of $Z^1$ is independently a divalent organic group represented by the following Chemical Formula 2,

[Chemical Formula 2]

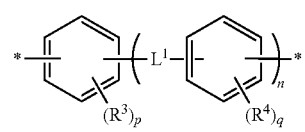

in the Chemical Formula 2, $R^3$ and $R^4$ are each independently a halogen, a cyano group, an alkenyl group having 2 to 10 carbon atoms, an alkyl group having 1 to 10 carbon atoms, an alkoxy group having 1 to 10 carbon atoms or a fluoroalkyl group having 1 to 10 carbon atoms, p and q are each independently an integer between 0 and 4, $L^1$ is a single bond, —O—, —CO—, —S—, —SO$_2$—, —C(CH$_3$)$_2$—, —C(CF$_3$)$_2$—, —CONH—, —COO—, —(CH$_2$)$_a$—, —O(CH$_2$)$_a$O—, —OCH$_2$—C(CH$_3$)$_2$—CH$_2$O— or —COO—(CH$_2$)$_a$—OCO—, wherein a is an integer between 1 to 10, and n is an integer between 0 and 3.

The above preparation method of a photo-alignment layer can provide a photo-alignment layer wherein a luminance variation rate represented by the following Equation 1 exhibits 41% or less.

$$\text{Luminance variation rate (\%)} = (|L0-L1|)/L0*100 \quad \text{[Equation 1]}$$

in the Equation 1,

L0 is an initial luminance wherein luminance at the black state is measured using a luminance measurement apparatus, after arranging two liquid crystal alignment layers so as to face each other, sealing their edges excluding an inlet so as to be spaced 1-2 mm apart from each other, injecting a liquid crystal and sealing the inlet to produce a liquid crystal cell, then attaching a polarizing plate to both sides of the liquid crystal cell so as to be perpendicular to each other, and attaching the polarizing plate to a backlight of 7,000 cd/m², and L1 is a late luminance wherein luminance at the black state is measured in the same manner as in the method of measuring L0, after driving the liquid crystal cell at 60° C. for 24 hours by applying a voltage of 12V at 60 Hz, and then turning off the voltage of the liquid crystal cell.

In Chemical Formula 1, $Y^1$ may be a tetravalent organic group derived from 1-methylcyclobutane, dimethylcyclobutane, 1,2,3,4-tetramethylcyclobutane, cyclopentane, 1-methylcyclopentane, cyclohexane, 1-methylcyclohexane, benzene, diphenyl ether, biphenyl, benzophenone, 2,2-diphenylpropane, diphenyl sulfone or perfluoropropane-2, 2-diyl dibenzene.

In particular, in Chemical Formula 1, $Y^1$ may be a tetravalent organic group derived from dimethylcyclobutane or 1,2,3,4-tetramethylcyclobutane.

And, in Chemical Formula 1, $Z^1$ may be a phenylene group or a biphenyldiyl group.

As an example, the diamine represented by Chemical Formula 1 may be one or more compounds selected from the group consisting of the following Chemical Formulae 1a to 1d.

[Chemical Formula 1a]

[Chemical Formula 1b]

[Chemical Formula 1c]

[Chemical Formula 1d]

As the tetracarboxylic acid or its anhydride, a tetracarboxylic acid or its anhydride of the following Chemical Formula 3 may be used.

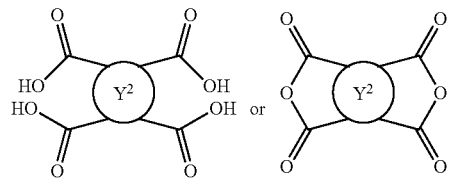

[Chemical Formula 3]

in Chemical Formula 3, $Y^2$ is a tetravalent organic group derived from cyclic hydrocarbons having 4 to 8 carbon atoms, or a tetravalent organic group derived from compounds in which two or more of said cyclic hydrocarbons are linked by a single bond, —O—, —CR$^1$R$^2$—, —CO—, —CONH—, —COO—, —S—, —SO$_2$— or a combination thereof, or a tetravalent organic group in which one or more hydrogens in said tetravalent organic group are substituted with an alkyl group having 1 to 3 carbon atoms, wherein $R^1$ and $R^2$ is each independently hydrogen, an alkyl group having 1 to 10 carbon atoms or a fluoroalkyl group having 1 to 10 carbon atoms.

Specifically, as the tetracarboxylic acid or its anhydride, a tetracarboxylic acid or its anhydride wherein $Y^2$ in Chemical Formula 3 is a tetravalent organic group having the following structures may be used.

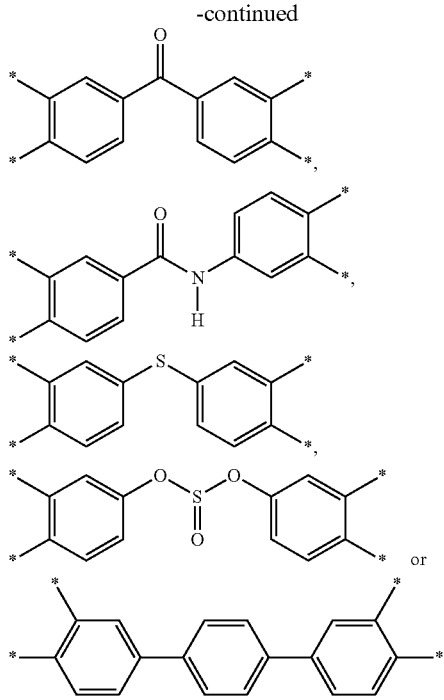

The $R^1$ and $R^2$ are each independently hydrogen, an alkyl group having 1 to 10 carbon atoms or a fluoroalkyl group having 1 to 10 carbon atoms.

A polymer having a repeating unit represented by the following Chemical Formula 4 can be prepared through the steps of preparing the polymer.

[Chemical Formula 4]

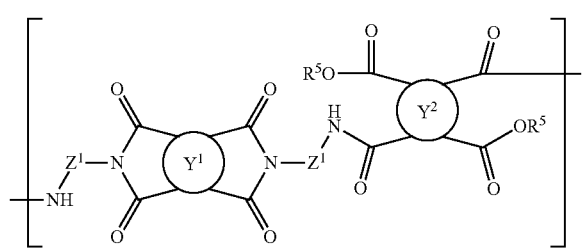

in the Chemical Formula 4, $Y^1$ and $Z^1$ are as defined in Chemical Formula 1, $Y^2$ is as defined in Chemical Formula 3, and each of $R^5$ is independently hydrogen or an alkyl group having 1 to 10 carbon atoms.

In the step of preparing the polymer, a diamine represented by the following Chemical Formula 5 can be further used.

$$H_2N-Z^1-NH_2 \qquad \text{[Chemical Formula 5]}$$

in the Chemical Formula 5, $Z^1$ is as defined in Chemical Formula 1.

In the step of preparing the polymer, a diamine represented by Chemical Formula 1 can be used alone; 1,2-bis(p-aminophenoxy)ethane can be used together with a diamine represented by Chemical Formula 1; or one or more co-diamines selected from a group consisting of 4,4'-oxydianiline and bis(p-aminophenoxy)methane can be used together with a diamine represented by Chemical Formula 1, wherein said co-diamine can be used in an amount of 1 to 40 mol % based on the total diamine.

When a diamine of Chemical Formula 5 is used, the above polymer can contain a repeating unit represented by the following Chemical Formula 6.

[Chemical Formula 6]

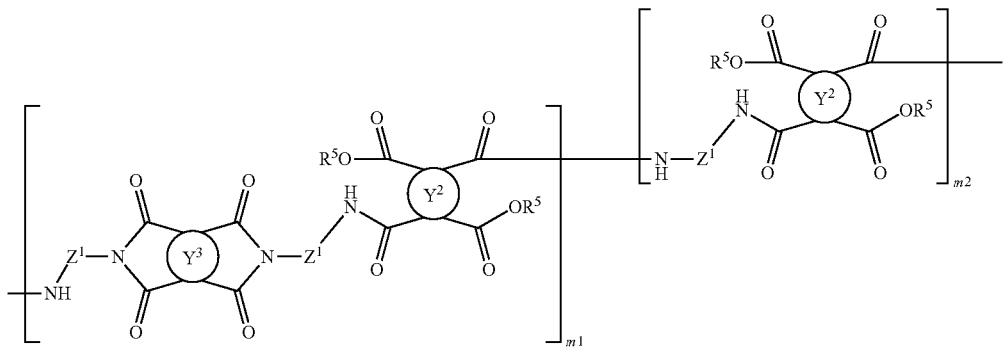

In the Chemical Formula 6, $Y^1$, $Y^2$, $Z^1$ and $R^5$ are as defined in Chemical Formula 4, m1 and m2 are each independently an integer of 1 to 500, as the repeating number of the corresponding repeating unit.

Through the step of preparing the above polymer, a polymer having a weight average molecular weight of 1,000 to 200,000 g/mol can be prepared.

Meanwhile, in the step of irradiating with light, a photo-alignment layer can be prepared by irradiating with light with a small exposure amount of 0.01 to 5 $J/cm^2$.

Advantageous Effects

The photo-alignment layer prepared according to the present invention exhibits a high imidization ratio as well as an excellent aligning stability of liquid crystal, chemical resistance and strength, and further is excellent in an after-image suppressing effect by an AC driving of a liquid crystal display element.

BRIEF DESCRIPTION OF DRAWINGS

FIG. 1 is a $^1$H-NMR spectrum of the diamine prepared in Preparation Example 1.

DETAILED DESCRIPTION OF THE EMBODIMENTS

Hereinafter, the method for preparing a photo-alignment layer according to specific embodiments of the present invention will be described in detail.

According to one embodiment of the invention, there is provided a method for preparing a photo-alignment layer, comprising the steps of preparing a polymer by reacting a diamine represented by the following Chemical Formula 1 with at least one tetracarboxylic acid or its anhydride; preparing a liquid crystal alignment agent by dissolving or dispersing said polymer in an organic solvent; and coating said liquid crystal alignment agent onto a substrate, and then subjecting to i) a sintering after an irradiation with light, or ii) a sintering during an irradiation with light, or iii) an irradiation with light after a sintering.

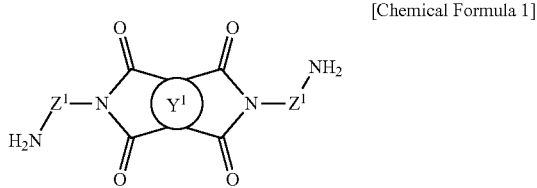

[Chemical Formula 1]

in the Chemical Formula 1, $Y^1$ is a tetravalent organic group derived from cyclic hydrocarbons having 4 to 8 carbon atoms, or a tetravalent organic group derived from a compound in which two or more of said cyclic hydrocarbons are linked by a single bond, —O—, —CR$^1$R$^2$—, —CO—, —CONH—, —COO—, —S—, —SO$_2$— or a combination thereof, or a tetravalent organic group in which one or more hydrogen in said tetravalent organic group is substituted with an alkyl group having 1 to 3 carbon atoms, with a proviso that $Y^1$ is not a tetravalent organic group derived from unsubstituted cyclobutane, wherein $R^1$ and $R^2$ is each independently hydrogen, an alkyl group having 1 to 10 carbon atoms or a fluoroalkyl group having 1 to 10 carbon atoms, each of $Z^1$ is independently a divalent organic group represented by the following Chemical Formula 2,

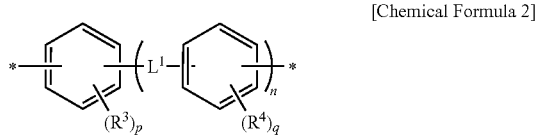

[Chemical Formula 2]

in the Chemical Formula 2, $R^3$ and $R^4$ are each independently halogen, a cyano group, an alkenyl group having 2 to 10 carbon atoms, an alkyl group having 1 to 10 carbon atoms, an alkoxy group having 1 to 10 carbon atoms or a fluoroalkyl group having 1 to 10 carbon atoms, p and q are each independently an integer between 0 and 4, $L^1$ is a single bond, —O—, —CO—, —S—, —SO$_2$—, —C(CH$_3$)$_2$—, —C(CF$_3$)$_2$—, —CONH—, —COO—, —(CH$_2$)$_a$—, —O(CH$_2$)$_a$O—, —OCH$_2$—C(CH$_3$)$_2$—CH$_2$O— or —COO—(CH$_2$)$_a$—OCO—, wherein a is an integer between 1 and 10, and n is an integer between 0 and 3.

The preparation method of a photo-alignment layer can provide a photo-alignment layer where a luminance variation rate represented by the following Equation 1 is 41% or less.

Luminance variation rate (%)=(|L0−L1|)/L0*100     [Equation 1]

in the Equation 1,

L0 is an initial luminance wherein luminance at the black state is measured using a luminance measurement apparatus, after arranging two liquid crystal alignment layers so as to face each other, sealing their edges excluding an inlet so as to be spaced 1-2 mm apart from each other, injecting a liquid crystal and sealing the inlet to produce a liquid crystal cell, then attaching a polarizing plate to both sides of the liquid crystal cell so as to be perpendicular to each other, and attaching it to a backlight of 7,000 cd/m$^2$, and L1 is a late luminance wherein luminance at the black state is measured in the same manner as in the method of measuring L0, after driving the liquid crystal cell at 60° C. for 24 hours by applying a voltage of 12V at 60 Hz, and then turning off the voltage of the liquid crystal cell.

The present inventors have found through experiments that, when a photo-alignment layer is prepared by using a polymer obtained by reacting a diamine containing imide group as in Chemical Formula 1 with a tetracarboxylic acid or its anhydride, it exhibits a high imidization ratio as well as excellent aligning stability of liquid crystal, chemical resistance and strength, and is excellent in an aftertime suppressing effect by an AC driving of a liquid crystal display element, thereby completing the present invention.

Unless there is any particular restriction in the disclosure, the terms can be defined as follows.

A cyclic hydrocarbon having 4 to 8 carbon atoms may be a cycloalkane having 4 to 8 carbon atoms, a cycloalkene having 4 to 8 carbon atoms or benzene. Specifically, the cyclic hydrocarbon having 4 to 8 carbon atoms may be cyclobutane, cyclopentane, cyclohexane, cycloheptane, cyclooctane, cyclohexene, or benzene.

An alkyl group having 1 to 10 carbon atoms may be a linear, branched or cyclic alkyl group. Specifically, the alkyl group having 1 to 10 carbon atoms may be a linear alkyl group having 1 to 10 carbon atoms; a linear alkyl group having 1 to 5 carbon atoms; a branched or cyclic alkyl group having 3 to 10 carbon atoms; or a branched or cyclic alkyl group having 3 to 6 carbon atoms. More specifically, the alkyl group having 1 to 10 carbon atoms may be methyl group, ethyl group, n-propyl group, iso-propyl group, n-butyl group, iso-butyl group, tert-butyl group, n-pentyl group, iso-pentyl group, neo-pentyl group, cyclohexyl group, or the like.

An alkoxy group having 1 to 10 carbon atoms may be a linear, branched or cyclic alkoxy group. Specifically, the alkoxy group having 1 to 10 carbon atoms may be a linear alkoxy group having 1 to 10 carbon atoms; a linear alkoxy group having 1 to 5 carbon atoms; a branched or cyclic alkoxy group having 3 to 10 carbon atoms; or a branched or cyclic alkoxy group having 3 to 6 carbon atoms. More specifically, the alkoxy group having 1 to 10 carbon atoms may be methoxy group, ethoxy group, n-propoxy group, iso-propoxy group, n-butoxy group, iso-butoxy group, tert-butoxy group, n-pentoxy group, iso-pentoxy group, neopentoxy group, cyclohexyloxy group, or the like.

A fluoroalkyl group having 1 to 10 carbon atoms may be a group in which one or more hydrogens of said alkyl group having 1 to 10 carbon atoms are substituted with fluorine.

An alkyl group having 1 to 3 carbon atoms may be a linear, branched or cyclic alkyl group. Specifically, the alkyl group having 1 to 3 carbon atoms may be methyl group, ethyl group, n-propyl group, iso-propyl group, cyclopropyl group, or the like.

An alkenyl group having 2 to 10 carbon atoms may be a linear, branched or cyclic alkenyl group. Specifically, the alkenyl group having 2 to 10 carbon atoms may be a linear alkenyl group having 2 to 10 carbon atoms, a linear alkenyl group having 2 to 5 carbon atoms, a branched alkenyl group having 3 to 10 carbon atoms, a branched alkenyl group having 3 to 6 carbon atoms, a cyclic alkenyl group having 5 to 10 carbon atoms or a cyclic alkenyl group having 6 to 8 carbon atoms. More specifically, the alkenyl group having 2 to 10 carbon atoms may be an ethenyl group, a propenyl group, a butenyl group, a pentenyl group, a cyclohexenyl group, or the like.

A multivalent organic group derived from a certain compound can mean a type of residual group wherein plural hydrogen atoms bonded to the certain compound have been removed. As an example, a tetravalent organic group derived from cyclobutane can mean a type of residual group wherein any of four hydrogen atoms bonded to the cyclobutane have been removed, and a divalent organic group derived from benzene can mean a type of residual group (phenylene group) wherein any of two hydrogen atoms bonded to benzene have been removed.

Halogen may be fluorine (F), chlorine (Cl), bromine (Br) or iodine (I).

A single bond means that a separate atom or atomic group is not present at the corresponding site. As an example, two benzenes can be linked through a single bond to form a biphenyl.

The same symbol contained in the chemical formulae in the present disclosure can mean a structure identical to or different from each other. As an example, $Z^1$ at both ends of Chemical Formula 1 may be an identical divalent organic group or two divalent organic groups different from each other.

In addition, —* in the chemical formulae means a type of residual group wherein a hydrogen atom is removed at the corresponding site. For example,

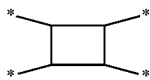

means a type of residual group wherein four hydrogens boned to the carbons at 1, 2, 3 and 4 positions of cyclobutane have been removed.

In the step of preparing the polymer, a diamine represented by Chemical Formula 1 is reacted with a tetracarboxylic acid or its anhydride to give a polyamic acid containing imide groups derived from said diamine. Since the polyamic acid contains imide groups to exhibit a high imidization ratio, said polyamic acid is expected to provide a liquid crystal display element having improved overall performances when used in a photo-alignment layer.

Since the above polymer contains imide groups derived from diamine, it has a structure in which an imide group and an amic acid group are chemically linked. Thereby, the polymer as used herein can be referred to a polyamic acid containing imide groups.

In Chemical Formula 1, $Y^1$ can be defined as described above. Thus, it is possible to provide a polymer of various structures which have a high photosensitivity and exhibit a high imidization ratio after a sintering process.

Specifically, $Y^1$ may be a tetravalent organic group derived from a compound such as 1-methylcyclobutane, dimethylcyclobutane, 1,2,3,4-tetramethylcyclobutane, cyclopentane, 1-methylcyclopentane, cyclohexane, 1-methylcyclohexane, benzene, diphenyl ether, biphenyl, benzophenone, 2,2-diphenylpropane, diphenylsulfone or perfluoropropane-2,2-diyl dibenzene.

Meanwhile, as a liquid crystal alignment agent, polyamic acid containing a cyclobutane skeleton is mainly used in order to obtain good overall performances. However, the imidization ratio of the polyamic acid containing a cyclobutane skeleton has been known as being very low. But, this problem can be resolved by using a diamine of Chemical Formula 1 wherein $Y^1$ is a tetravalent organic group derived from dimethylcyclobutane or 1,2,3,4-tetramethylcyclobutane. Specifically, when using a diamine of Chemical Formula 1 wherein $Y^1$ is a tetravalent organic group derived from dimethylcyclobutane or 1,2,3,4-tetramethylcyclobutane, polyamic acid containing imide groups can be provided, thereby ensuring a high imidization ratio, and a polymer exhibiting an improved light sensitivity together with improved overall performances can be provided.

In Chemical Formula 1, $Z^1$ can be defined as a divalent organic group of Chemical Formula 2 and thus polymers having various structures which can exhibit the above-described effects can be provided.

In Chemical Formula 2, hydrogens are bonded to the carbon atoms which are not substituted with $R^3$ or $R^4$, and a plurality of $R^3$ and $R^4$ may be substituents identical to or different from each other when p or q is an integer between 2 and 4.

Specifically, $Z^1$ may be identical to or different from each other, and each independently a phenylene group, a biphenyldiyl group or the like.

More specifically, diamine represented by Chemical Formula 1 may be at least one compound selected from the following Chemical Formulae 1a to 1d.

[Chemical Formula 1a]

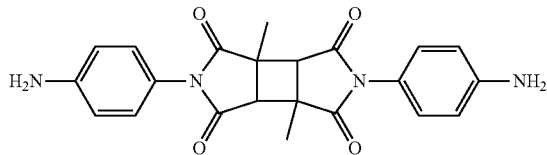

[Chemical Formula 1b]

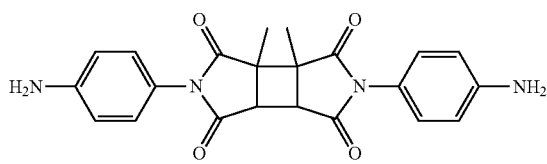

[Chemical Formula 1c]

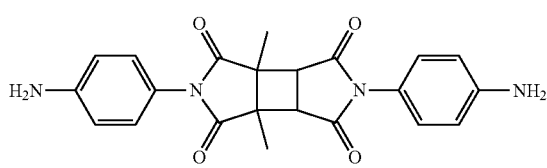

[Chemical Formula 1d]

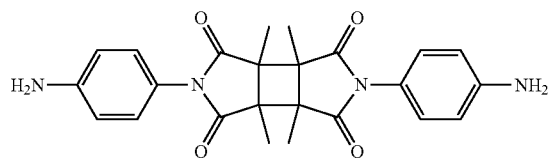

Meanwhile, in the step of preparing the polymer, a tetracarboxylic acid or its anhydride of the following Chemical Formula 3 may be used.

[Chemical Formula 3]

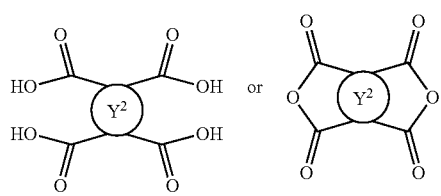

In the Chemical Formula 3, $Y^2$ is a tetravalent organic group derived from cyclic hydrocarbons having 4 to 8 carbon atoms, or a tetravalent organic group derived from compounds in which two or more of said cyclic hydrocarbons are linked by a single bond, —O—, —$CR^1R^2$— ($R^1$ and $R^2$ are each independently hydrogen, an alkyl group having 1 to 10 carbon atoms or a fluoroalkyl group having 1 to 10 carbon atoms), —CO—, —CONH—, —COO—, —S—, —$SO_2$— or a combination thereof, or a tetravalent organic group wherein one or more hydrogens of said tetravalent organic groups are substituted with an alkyl group having 1 to 3 carbon atoms.

Specifically, as a tetracarboxylic acid or its anhydride of Chemical Formula 3 used in the step for preparing the polymer, it is possible to employ a compound or its anhydride wherein $Y^2$ in Chemical Formula 3 is a tetravalent organic group having the following structures:

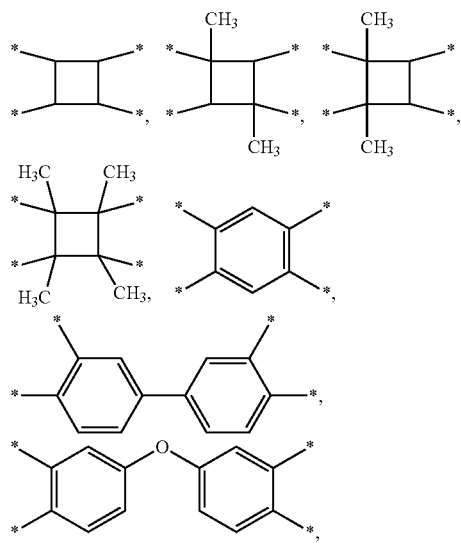

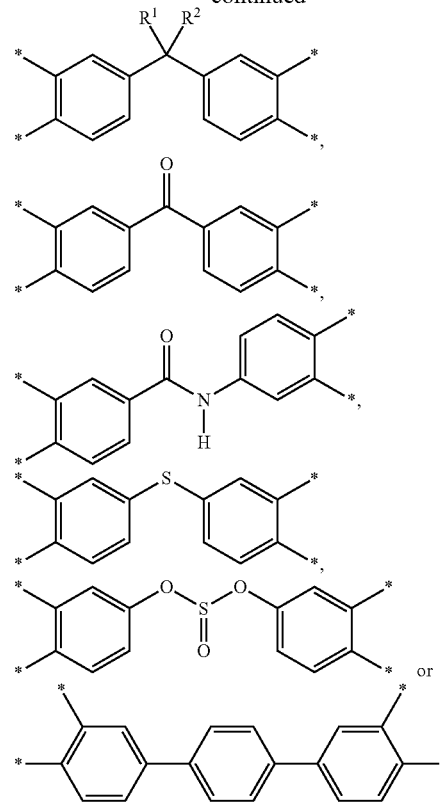

wherein $R^1$ and $R^2$ are each independently hydrogen, an alkyl group having 1 to 10 carbon atoms or a fluoroalkyl group having 1 to 10 carbon atoms.

The polymer prepared as above by reacting a diamine of Chemical Formula 1 with a tetracarboxylic acid or its anhydride of Chemical Formula 3 can include a repeating unit of the following Chemical Formula 4.

[Chemical Formula 4]

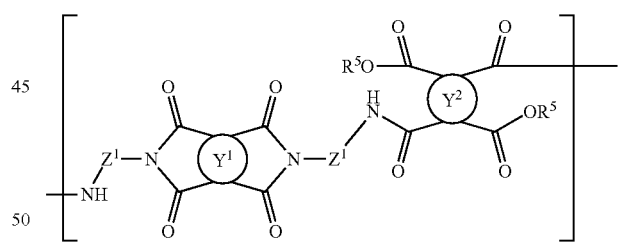

In the Chemical Formula 4, $Y^1$ and $Z^1$ are as defined in Chemical Formula 1, $Y^2$ is as defined in Chemical Formula 3, and $R^5$ is each independently hydrogen or an alkyl group having 1 to 10 carbon atoms.

As previously described, a polymer prepared by using a diamine of Chemical Formula 1 and containing a repeating unit of Chemical Formula 4 contains imide groups derived from the diamine of Chemical Formula 1, thereby exhibiting a high imidization ratio in the sintering process of a liquid crystal alignment agent.

In particular, when using a diamine wherein $Y^1$ in Chemical Formula 1 is a tetravalent organic group derived from dimethylcyclobutane or 1,2,3,4-tetramethylcyclobutane, it is possible to significantly improve the imidization ratio of the polymer containing a cyclobutane skeleton which is known to exhibit a low imidization ratio.

In the step of preparing the polymer, as a diamine, a diamine of Chemical Formula 1 may be used alone; or in a mixture with a diamine different from the diamine of Chemical Formula 1.

For example, as a diamine different from the diamine of Chemical Formula 1, a diamine represented by the following Chemical Formula 5 can be used.

$$H_2N-Z^1-NH_2 \quad \text{[Chemical Formula 5]}$$

In the Chemical Formula 5, $Z^1$ is as defined in Chemical Formula 1.

The diamine of the Chemical Formula 5 can be suitably used according to desired physical properties, and for example, can be used in an amount of 0.001 mol % to 99.9 mol %, 0.1 mol % to 80 mol %, 0.1 mol % to 75 mol %, 10 mol % to 60 mol %, or 10 mol % to 40 mol %, based on total diamine. Within such ranges, a high imidization ratio and desired physical properties can be ensured.

In view of improving the liquid crystal aligning stability of a photo-alignment layer prepared by the above preparation method, it is advantageous that, as a diamine, a diamine of Chemical Formula 1 is used alone; a diamine of Chemical Formula 1 is used together with 1,2-bis(p-aminophenoxy) ethane which is an example of Chemical Formula 5; or a diamine of Chemical Formula 1 is used together with at least one co-diamine selected from a group consisting of 4,4'-oxydianiline and bis(p-aminophenoxy)methane which are another example of Chemical Formula 5, and said co-diamine is used in amount of 1 to 40 mol % based on the total diamine. By using the above described diamine in the step of preparing the above polymer, the luminance variation rate represented by Equation 1 can be further reduced to 40% or less, 35% or less, 30% or less, or 25% or less.

Among these diamines, when a diamine of Chemical Formula 1 is used alone; or when a diamine of Chemical Formula 1 is used together with 1,2-bis(p-aminophenoxy) ethane which is an example of Chemical Formula 5, the luminance variation rate represented by Equation 1 can be further reduced to 20% or less, 15% or less or 10% or less. In particular, when a diamine of Chemical Formula 1 is used alone, the luminance variation rate represented by Equation 1 can be yet further reduced to 5% or less or 3% or less. Since the liquid crystal aligning stability is best excellent when the above luminance variation rate is 0%, the lower limit is not particularly limited, and it may be 0%.

When a diamine of Chemical Formula 5 is additionally used, the polymer can comprise a repeating unit represented by the following Chemical Formula 6.

In the Chemical Formula 6, $Y^1$, $Y^2$, $Z^1$ and $R^5$ are as defined in Chemical Formula 4, m1 and m2 are each independently an integer between 1 and 500 as the repeating number of the corresponding repeating unit. At this time, m2 can be adjusted depending on mol % of diamine of Chemical Formula 5 with respect to total diamine.

Meanwhile, as described above, the same symbol in the chemical formulae described in the present disclosure can mean a structure identical to or different from each other. For example, each of $Y^2$ in Chemical Formula 6 is a tetravalent organic group identical to each other or a tetravalent organic group different from each other.

In the step of preparing the polymer, a polymer with a suitable polymerization degree can be provided depending on desired physical properties. As an example, in the step of preparing the polymer, a polymer with a weight average molecular weight of 1,000 to 200,000 g/mol can be provided. Within such a range, a photo-alignment layer exhibiting good overall performances can be provided.

Meanwhile, in the step of preparing a liquid crystal alignment agent, a liquid crystal alignment agent can be provided by dissolving or dispersing a polymer prepared through the step of preparing the above polymer.

Specific examples of the organic solvent may include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethylsulfone, hexamethylsulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethylamylketone, methylnonylketone, methylethylketone, methylisoamylketone, methylisopropylketone, cyclohexanone, ethylene carbonate, propylene carbonate, diglyme and 4-hydroxy-4-methyl-2-petanone, or the like. These may be used alone or in combination.

In addition, the above liquid crystal alignment agent can further include other components in addition to the polymer and organic solvent. As a non-limiting example, when a liquid crystal alignment agent is coated, it can further contain additives which can improve the uniformity of layer thickness or the evenness of the surface, or improve the adhesion between a photo-alignment layer and a substrate, or change the dielectric constant or conductivity of the photo-alignment layer, or increase the compactness of the photo-alignment layer. As these additives, it can be exem-

[Chemical Formula 6]

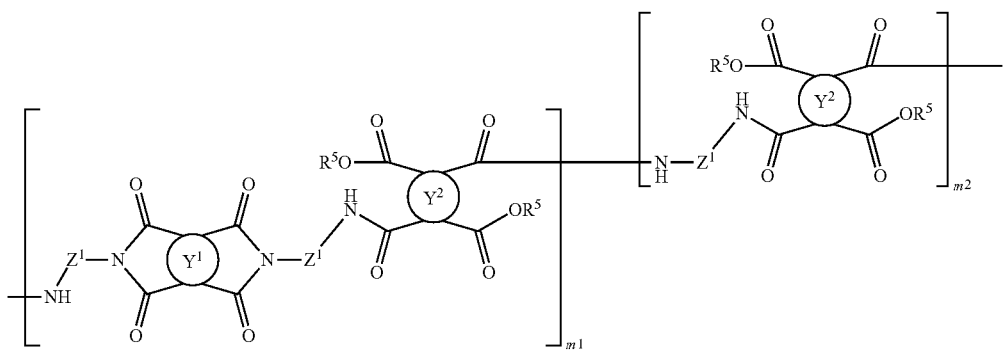

plified by various solvents, surfactants, silane compounds, dielectric substances, cross-linkable compounds, or the like.

The liquid crystal alignment agent prepared through the step of preparing the liquid crystal alignment agent can provide a liquid crystal alignment layer by a rubbing alignment method and a photo-alignment method. In the present disclosure, a liquid crystal alignment layer provided by the rubbing alignment method is referred to as a rubbing alignment layer, and a liquid crystal alignment layer provided by the photo-alignment method is referred to as a photo-alignment layer.

As described above, the present inventors have found through experiments that a liquid crystal alignment agent prepared through the step for preparing the polymer and the step for preparing a liquid crystal alignment agent exhibited a good aligning stability of liquid crystal only when a photo-alignment layer is provided by a photo-alignment method.

Specifically, comparing Examples 1 and 2 with Comparative Examples 3 and 4 which will be described below, it can be confirmed that, when a liquid crystal alignment agent containing a specific polymer according to one example of the present disclosure is used, but a rubbing alignment layer is provided by the rubbing alignment method (Comparative Examples 3 and 4), the luminance variation rate is very high to about 65 to 73%. In contrast, it is confirmed that, when a liquid crystal alignment agent containing the same polymer is provided as a photo-alignment layer by the photo-alignment method (Examples 1 and 2), the luminance variation rate is very low to about 2 to 7%.

When a liquid crystal alignment agent is obtained through the step of preparing the liquid crystal alignment agent, it is coated and sintered on a substrate and then irradiated with light, thereby providing a photo-alignment layer. If necessary, the above sintering and light irradiation can be carried out simultaneously or the sintering can be carried out after the light irradiation.

Specifically, a liquid crystal alignment agent is coated on a substrate to be desired to form a photo-alignment layer. A coating method is not particularly restricted, and a method such as bar coating, spin coating, screen printing, offset printing, flexography, ink jet, or the like can be employed.

Thereafter, the liquid crystal alignment agent coated on the substrate is sintered. The above sintering can be carried out at about 50 to 300° C. by a heating means such as a hot plate, a hot air circulation furnace, or an infrared ray furnace.

The polymer contained in the liquid crystal alignment agent can, even without using any additive for increasing the imidization ratio, exhibit a high imidization ratio by introducing into a sintering process in a state containing imide groups. Thus, when using the above polymer, a photo-alignment layer having good overall physical properties can be provided.

After the above sintering process, the resulting layer is irradiated with a polarized ultraviolet light according to a desired aligning direction of the liquid crystal to provide a photo-alignment layer. In particular, if a diamine in which $Y^1$ is dimethylcyclobutane or 1,2,3,4-tetramethylcyclobutane is used as a diamine of Chemical Formula 1, it can exhibit excellent photosensitivity, thereby ensuring excellent liquid crystal aligning property. Specifically, the exposure amount of ultraviolet light that is irradiated on the layer can be adjusted at a very low level of 0.01 to 5 J/cm$^2$, 0.01 to 3 J/cm$^2$, 0.01 to 2 J/cm$^2$ or 0.01 to 1.5 J/cm$^2$.

The above photo-alignment layer can be incorporated into a liquid crystal cell by a known method, and similarly, said liquid crystal cell can be incorporated into a liquid crystal display element. The above photo-alignment layer is prepared by using the above described specific polymers, thereby exhibiting excellent liquid crystal aligning stability, chemical resistance and strength, and providing a liquid crystal display element having an excellent afterimage suppressing effect by AC driving.

Specifically, the above photo-alignment layer has a luminance variation rate represented by Equation 1 of 41% or less, thereby exhibiting very excellent liquid crystal aligning stability. In addition, as described above, when the above described diamine is used as a diamine in the step of preparing a polymer for forming said photo-alignment layer, the luminance variation rate can be further reduced to 40% or less, 35% or less, 30% or less, or 25% or less. For more details of the specific measurement method of the above luminance variation rate refer to the contents described in test examples below.

Hereinafter, the action and effect of the invention will be described in detail, through specific examples of the invention. However, the examples are provided only to illustrate the present invention, and the scope of the invention is in no way restricted thereby.

Below, the abbreviations as used herein refers to the following compounds.

CBDA: Cyclobutane-1,2,3,4-tetracarboxylic acid dianhydride
DMCBDA: 1,3-Dimethylcyclobutane-1,2,3,4-tetracarboxylic acid dianhydride
PA: Phthalic acid anhydride
p-PDA: p-Phenylenediamine
ODA: 4,4'-Oxydianiline
MeDA: Bis(p-aminophenoxy)methane
EDA: 1,2-Bis(p-aminophenoxy)ethane Preparation Example 1: Preparation of a Diamine

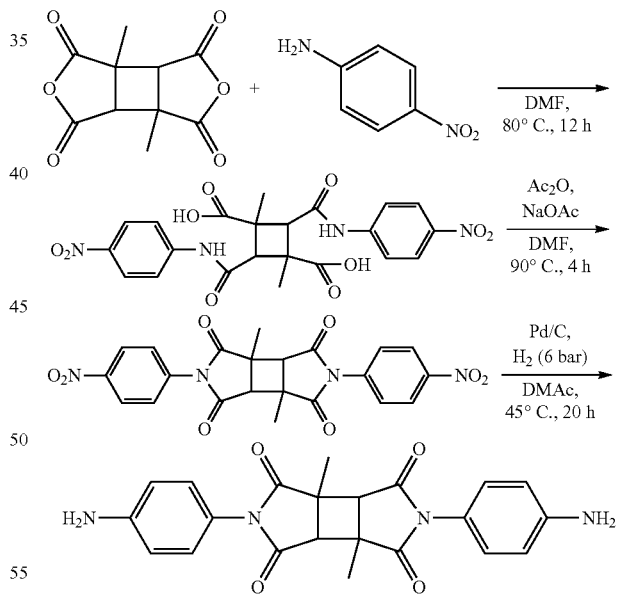

DMCBDA and 4-nitroaniline were dissolved in DMF (dimethylformamide) to prepare a mixture. Then, the mixture was reacted at about 80° C. for about 12 hours to prepare an amic acid. Then, the resulting amic acid was dissolved in DMF, to which acetic anhydride (Ac$_2$O) and sodium acetate (NaOAc) were added to prepare a mixture. Next, amic acid contained in said mixture was subjected to an imidization at about 90° C. for about 4 hours. Thus the imide thus obtained was dissolved in DMAc (dimethylacetamide), to which Pd/C was added to prepare a mixture.

This mixture was subjected to a reduction at 45° C. under hydrogen pressure of 6 bar for about 20 hours to prepare a desired diamine.

$^1$H NMR (DMSO-d$_6$, 500 MHz, ppm): 6.97 (d, 4H, aromatic), 6.63 (d, 4H, aromatic), 5.37 (s, 4H, —NH$_2$), 3.40 (s, 4H, —CH), 1.33 (s, 6H, —CH$_3$)

Preparation Example 2: Preparation of a Diamine

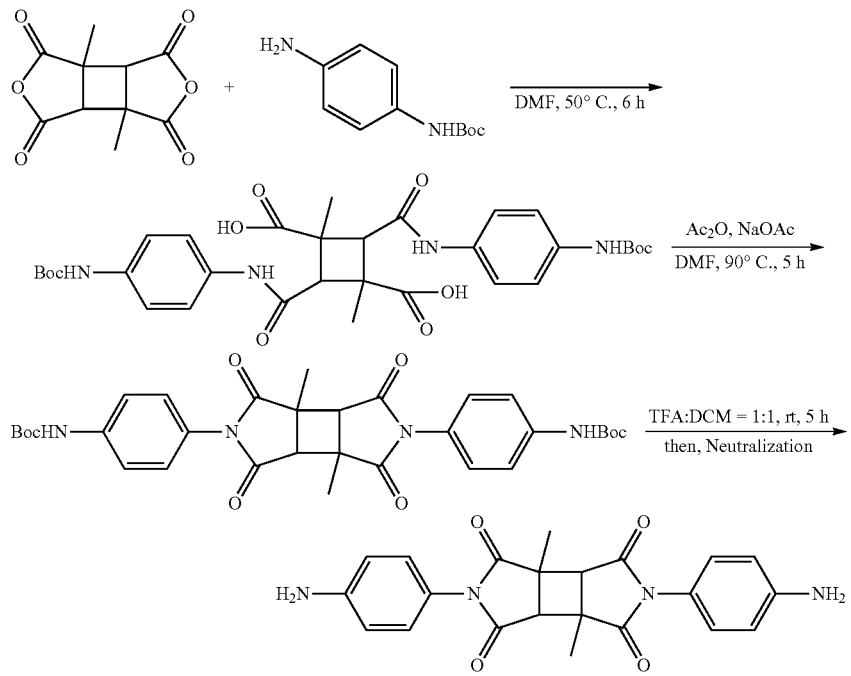

DMCBDA and N-Boc-(tert-Butoxycarbonyl)-para-phenylene diamine were dissolved in DMF (dimethylformamide) to prepare a mixture. Then, the mixture was reacted at about 50° C. for about 6 hours to prepare an amic acid. Then, the resulting amic acid was dissolved in DMF, to which acetic anhydride (Ac$_2$O) and sodium acetate (NaOAc) were added to prepare a mixture. Next, amic acid contained in said mixture was subjected to an imidization at about 90° C. for about 5 hours. The imide thus obtained was dissolved in a mixed solvent of TFA (trifluoroacetic acid) and DCM (dichloromethane), and then stirred for 5 hours to remove the protective BOC group. The solid thus obtained was added to water, to which 2N KOH aqueous solution was slowly added dropwise to adjust pH to 12. And the resulting solid was recrystallized in a mixed solvent of THF and distilled water in a ratio of 1:1 to give a desired diamine.

$^1$H NMR (DMSO-d$_6$, 500 MHz, ppm): 6.97 (d, 4H, aromatic), 6.63 (d, 4H, aromatic), 5.37 (s, 4H, —NH$_2$), 3.40 (s, 4H, —CH), 1.33 (s, 6H, —CH$_3$)

Example 1: Preparation of a Photo-Alignment Layer

<Preparation of a Polymer and a Liquid Crystal Alignment Agent>

A 250 mL three-neck flask was fixed to a mechanical stirring equipment, and the flask was immersed and cooled in a container filled with water and ice. Thereafter, 12.887 g (0.0319 mol) of diamine prepared in Preparation Example 1 and 113.76 g of NMP (N-methyl-2-pyrrolidone) were added to the above flask under a nitrogen atmosphere and stirred until the diamine was dissolved. At this time, the temperature of the flask was maintained at 0 to 10° C. using ice.

Thereafter, 7 g (0.0312 mol) of DMCBDA was added to the above flask under a flow of nitrogen gas and stirred for 1 hour, and 0.1888 g (0.0013 mol) of PA was then added as a sealant and polymerized for 24 hours. A mixed solvent of NMP and 2-butoxyethanol in a ratio of 8:2 was added to the flask, and the resulting mixture was then allowed to pass through a 0.1 μm filter to give a polymer in which impurities were eliminated. The polymer thus obtained was diluted to a ratio of 4 to 5% by weight of solid content to prepare a liquid crystal alignment agent.

<Preparation of a Photo-Alignment Layer>

Thereafter, onto a substrate (a lower plate) with an ITO electrode pattern formed on a glass substrate having a size of 25 mm×27 mm and a substrate (an upper plate) having no ITO electrode pattern formed on the same glass substrate, the above liquid crystal alignment agent was sufficiently dropped and then spin-coated at about 2,000 to 3,500 rpm for 30 seconds. Under these conditions, a coating layer having a final thickness of 70 to 150 nm was formed on the lower plate and the upper plate.

The upper plate and the lower plate coated with the liquid crystal alignment agent were placed on a hot plate of about 70° C. and pre-sintered for 100 seconds, and then sintered (cured) on a hot plate of about 230° C. for 1,000 seconds.

In order to align the coating layer thus obtained, the layers formed on the upper plate and the lower plate were exposed with an ultraviolet light at 254 nm in an appropriate exposure amount by means of an Exposure machine (UIS-S2021J7-YD01, Ushio LPUV) attached with a linear polarizer. And the upper plate and the lower plate thus obtained were heat-treated on a hot plate of 230° C. for 1000 seconds to form a photo-alignment layer each on the upper plate and the lower plate.

Example 2: Preparation of a Photo-Alignment Layer

<Preparation of a Polymer and a Liquid Crystal Alignment Agent>

A 250 mL three-neck flask was fixed to a mechanical stirring equipment, and the flask was immersed and cooled in a container filled with water and ice. Thereafter, 9.6649 g (0.0239 mol) of diamine prepared in Preparation Example 1, 1.946 g (0.008 mol) of EDA and 106.532 g of NMP (N-methyl-2-pyrrolidone) were added to the above flask under a nitrogen atmosphere and stirred until the diamine was dissolved. At this time, the temperature of the flask was maintained at 0 to 10° C. using ice.

Thereafter, 7 g (0.0312 mol) of DMCBDA was added to the above flask under a flow of nitrogen gas and stirred for 1 hour, and 0.1888 g (0.0013 mol) of PA was then added as a sealant and polymerized for 24 hours. A mixed solvent of NMP and 2-butoxyethanol in a ratio of 8:2 was added to the flask, and the resulting mixture was then allowed to pass through a 0.1 μm filter to give a polymer in which impurities were eliminated. The polymer thus obtained was diluted to a ratio of 4 to 5% by weight of solid content to prepare a liquid crystal alignment agent.

<Preparation of a Photo-Alignment Layer>

A photo-alignment layer was formed on the upper plate and the lower plate by the same procedure as in Example 1, except that the liquid crystal alignment agent prepared in Example 2 was used instead of the liquid crystal alignment agent prepared in Example 1.

Example 3: Preparation of a Photo-Alignment Layer

<Preparation of a Polymer and a Liquid Crystal Alignment Agent>

A 250 mL three-neck flask was fixed to a mechanical stirring equipment, and the flask was immersed and cooled in a container filled with water and ice. Thereafter, 7.3638 g (0.0182 mol) of diamine prepared in Preparation Example 1, 4.448 g (0.0182 mol) of EDA and 113.489 g of NMP (N-methyl-2-pyrrolidone) were added to the above flask under a nitrogen atmosphere and stirred until the diamine was dissolved. At this time, the temperature of the flask was maintained at 0 to 10° C. using ice.

Thereafter, 8 g (0.0357 mol) of DMCBDA was added to the above flask under a flow of nitrogen gas and stirred for 1 hour, and 0.2158 g (0.0015 mol) of PA was then added as a sealant and polymerized for 24 hours. A mixed solvent of NMP and 2-butoxyethanol in a ratio of 8:2 was added to the flask, and the resulting mixture was then allowed to pass through a 0.1 μm filter to give a polymer in which impurities were eliminated. The polymer thus obtained was diluted to a ratio of 4 to 5% by weight of solid portion to prepare a liquid crystal alignment agent.

<Preparation of a Photo-Alignment Layer>

A photo-alignment layer was formed on the upper plate and the lower plate by the same procedure as in Example 1 except that the liquid crystal alignment agent prepared in Example 3 was used instead of the liquid crystal alignment agent prepared in Example 1.

Example 4: Preparation of a Photo-Alignment Layer

<Preparation of a Polymer and a Liquid Crystal Alignment Agent>

A 250 mL three-neck flask was fixed to a mechanical stirring equipment, and the flask was immersed and cooled in a container filled with water and ice. Thereafter, 3.912 g (0.0097 mol) of diamine prepared in Preparation Example 1, 7.089 g (0.029 mol) of EDA and 111.804 g of NMP (N-methyl-2-pyrrolidone) were added to the above flask under a nitrogen atmosphere and stirred until the diamine was dissolved. At this time, the temperature of the flask was maintained at 0 to 10° C. using ice.

Thereafter, 8.5 g (0.0379 mol) of DMCBDA was added to the above flask under a flow of nitrogen gas and stirred for 1 hour, and 0.2292 g (0.0015 mol) of PA was then added as a sealant and polymerized for 24 hours. A mixed solvent of NMP and 2-butoxyethanol in a ratio of 8:2 was added to the flask, and the resulting mixture was then allowed to pass through a 0.1 μm filter to give a polymer in which impurities were eliminated. The polymer thus obtained was diluted to a ratio of 4 to 5% by weight of solid portion to prepare a liquid crystal alignment agent.

<Preparation of a Photo-Alignment Layer>

A photo-alignment layer was formed on the upper plate and the lower plate by the same procedure as in Example 1, except that the liquid crystal alignment agent prepared in Example 4 was used instead of the liquid crystal alignment agent prepared in Example 1.

Example 5: Preparation of a Photo-Alignment Layer

<Preparation of a Polymer and a Liquid Crystal Alignment Agent>

A 250 mL three-neck flask was fixed to a mechanical stirring equipment, and the flask was immersed and cooled in a container filled with water and ice. Thereafter, 9.6649 g (0.0239 mol) of diamine prepared in Preparation Example 1, 1.8343 (0.008 mol) of MeDA and 106.899 g of NMP (N-methyl-2-pyrrolidone) were added to the above flask under a nitrogen atmosphere and stirred until the diamine was dissolved. At this time, the temperature of the flask was maintained at 0 to 10° C. using ice.

Thereafter, 7 g (0.0312 mol) of DMCBDA was added to the above flask under a flow of nitrogen gas and stirred for 1 hour, and 0.1888 g (0.0013 mol) of PA was then added as a sealant and polymerized for 24 hours. A mixed solvent of NMP and 2-butoxyethanol in a ratio of 8:2 was added to the flask, and the resulting mixture was then allowed to pass through a 0.1 μm filter to give a polymer in which impurities were eliminated. The polymer thus obtained was diluted to a ratio of 4 to 5% by weight of solid content to prepare a liquid crystal alignment agent.

<Preparation of a Photo-Alignment Layer>

A photo-alignment layer was formed on the upper plate and the lower plate by the same procedure as in Example 1, except that the liquid crystal alignment agent prepared in Example 5 was used instead of the liquid crystal alignment agent prepared in Example 1.

Example 6: Preparation of a Photo-Alignment Layer

<Preparation of a Polymer and a Liquid Crystal Alignment Agent>

A 250 mL three-neck flask was fixed to a mechanical stirring equipment, and the flask was immersed and cooled in a container filled with water and ice. Thereafter, 7.3638 g (0.0182 mol) of diamine prepared in Preparation Example 1, 4.1927 g (0.0182 mol) of MeDA and 112.043 g of NMP (N-methyl-2-pyrrolidone) were added to the above flask under a nitrogen atmosphere and stirred until the diamine was dissolved. At this time, the temperature of the flask was maintained at 0 to 10° C. using ice.

Thereafter, 8 g (0.0357 mol) of DMCBDA was added to the above flask under a flow of nitrogen gas and stirred for 1 hour, and 0.2158 g (0.0015 mol) of PA was then added as a sealant and polymerized for 24 hours. A mixed solvent of NMP and 2-butoxyethanol in a ratio of 8:2 was added to the flask, and the resulting mixture was then allowed to pass through a 0.1 μm filter to give a polymer in which impurities were eliminated. The polymer thus obtained was diluted to a ratio of 4 to 5% by weight of solid content to prepare a liquid crystal alignment agent.

<Preparation of a Photo-Alignment Layer>

A photo-alignment layer was formed on the upper plate and the lower plate by the same procedure as in Example 1, except that the liquid crystal alignment agent prepared in Example 6 was used instead of the liquid crystal alignment agent prepared in Example 1.

Example 7: Preparation of a Photo-Alignment Layer

<Preparation of a Polymer and a Liquid Crystal Alignment Agent>

A 250 mL three-neck flask was fixed to a mechanical stirring equipment, and the flask was immersed and cooled in a container filled with water and ice. Thereafter, 8.9746 g (0.0222 mol) of diamine prepared in Preparation Example 1, 1.7033 g (0.0074 mol) of ODA and 98.335 g of NMP (N-methyl-2-pyrrolidone) were added to the above flask under a nitrogen atmosphere and stirred until the diamine was dissolved. At this time, the temperature of the flask was maintained at 0 to 10° C. using ice.

Thereafter, 6.5 g (0.029 mol) of DMCBDA was added to the above flask under a flow of nitrogen gas and stirred for 1 hour, and 0.1753 g (0.0012 mol) of PA was then added as a sealant and polymerized for 24 hours. A mixed solvent of NMP and 2-butoxyethanol in a ratio of 8:2 was added to the flask, and the resulting mixture was then allowed to pass through a 0.1 μm filter to give a polymer in which impurities were eliminated. The polymer thus obtained was diluted to a ratio of 4 to 5% by weight of solid content to prepare a liquid crystal alignment agent.

<Preparation of a Photo-Alignment Layer>

A photo-alignment layer was formed on the upper plate and the lower plate by the same procedure as in Example 7, except that the liquid crystal alignment agent prepared in Example 5 was used instead of the liquid crystal alignment agent prepared in Example 1.

Example 8: Preparation of a Photo-Alignment Layer

<Preparation of a Polymer and a Liquid Crystal Alignment Agent>

A 250 mL three-neck flask was fixed to a mechanical stirring equipment, and the flask was immersed and cooled in a container filled with water and ice. Thereafter, 6.4433 g (0.0159 mol) of diamine prepared in Preparation Example 1, 3.6686 g (0.0159 mol) of ODA and 98.037 g of NMP (N-methyl-2-pyrrolidone) were added to the above flask under a nitrogen atmosphere and stirred until the diamine was dissolved. At this time, the temperature of the flask was maintained with ice between 0 and 10° C.

Thereafter, 7 g (0.0312 mol) of DMCBDA was added to the above flask under a flow of nitrogen gas and stirred for 1 hour, and 0.1888 g (0.0013 mol) of PA was then added as a sealant and polymerized for 24 hours. A mixed solvent of NMP and 2-butoxyethanol in a ratio of 8:2 was added to the flask, and then the resulting mixture was allowed to pass through a 0.1 μm filter to give a polymer in which impurities were eliminated. The polymer thus obtained was diluted to a ratio of 4 to 5% by weight of solid content to prepare a liquid crystal alignment agent.

<Preparation of a Photo-Alignment Layer>

A photo-alignment layer was formed on the upper plate and the bottom plate by the same procedure as in Example 1, except that the liquid crystal alignment agent prepared in Example 8 was used instead of the liquid crystal alignment agent prepared in Example 1.

Comparative Example 1: Preparation of a Photo-Alignment Layer

<Preparation of a Polymer and a Liquid Crystal Alignment Agent>

A 250 mL three-neck flask was fixed to a mechanical stirring equipment, and the flask was immersed and cooled in a container filled with water and ice. Thereafter, 7.0 g (0.06473 mol) of p-PDA and 113.071 g of NMP (N-methyl-2-pyrrolidone) were added to the above flask under a nitrogen atmosphere and stirred until the diamine was dissolved. At this time, the temperature of the flask was maintained with ice between 0 and 10° C.

Thereafter, 12.187 g (0.06214 mol) of CBDA was added to the above flask under a flow of nitrogen gas and stirred for 1 hour, and 0.767 g (0.00518 mol) of PA was then added as a sealant and polymerized for 24 hours. A mixed solvent of NMP and 2-butoxyethanol in a ratio of 8:2 was added to the flask, and the resulting mixture was then allowed to pass through a 0.1 μm filter to give a polymer in which impurities were eliminated. The polymer thus obtained was diluted to a ratio of 4 to 5% by weight of solid portion to prepare a liquid crystal alignment agent.

<Preparation of a Photo-Alignment Layer>

A photo-alignment layer was formed on the upper plate and the lower plate by the same procedure as in Example 1, except that the liquid crystal alignment agent prepared in Comparative Example 1 was used instead of the liquid crystal alignment agent prepared in Example 1.

Comparative Example 2: Preparation of a Photo-Alignment Layer

<Preparation of a Polymer and a Liquid Crystal Alignment Agent>

A 250 mL three-neck flask was fixed to a mechanical stirring equipment, immersed and cooled in a container filled with water and ice. Thereafter, 6.0 g (0.05548 mol) of p-PDA and 106.293 g of NMP (N-methyl-2-pyrrolidone) were added to the above flask under a nitrogen atmosphere and stirred until the diamine was dissolved. At this time, the temperature of the flask was maintained with ice between 0 and 10° C.

Thereafter, 11.94 g (0.05326 mol) of DMCBDA was added to the above flask under a flow of nitrogen gas and stirred for 1 hour, and 0.657 g (0.00444 mol) of PA was then added as a sealant and polymerized for 24 hours. A mixed solvent of NMP and 2-butoxyethanol in a ratio of 8:2 was added to the flask, and the resulting mixture was then allowed to pass through a 0.1 μm filter to give a polymer in which impurities were eliminated. The polymer thus obtained was diluted to a ratio of 4 to 5% by weight of solid portion to prepare a liquid crystal alignment agent.

<Preparation of a Photo-Alignment Layer>

A photo-alignment layer was formed each on the upper plate and the lower plate by the same procedure as in Example 1, except that the liquid crystal alignment agent prepared in Comparative Example 2 was used instead of the liquid crystal alignment agent prepared in Example 1.

Comparative Example 3: Preparation of a Rubbing Alignment Layer

Onto a substrate (a bottom plate) wherein an ITO electrode pattern was formed on a glass substrate having a size of 25 mm×27 mm and a substrate (an upper plate) wherein ITO electrode pattern was not formed on the glass substrate, the above liquid crystal alignment agent was sufficiently dropped and then spin-coated at about 2,000 to 3,500 rpm for 30 seconds. Under these conditions, a coating layer having a final thickness of 70 to 150 nm was formed on the lower plate and the upper plate.

The upper plate and the lower plate coated with a liquid crystal alignment agent were placed on a hot plate of about 70° C. to pre-sinter the same for 100 seconds and then sintered (cured) on a hot plate of about 230° C. for 2,000 seconds.

And, the above coating layers were rubbed under the conditions of a roll rotation frequency of 300 rpm, a roll progress speed of 20 mm/sec and a press-in amount of 0.5 mm by means of a roll with a diameter of 120 mm and wrapped with a rayon cloth, thereby forming a rubbing alignment layer on the upper plate and the lower plate.

Comparative Example 4: Preparation of a Rubbing Alignment Layer

A rubbing photo-alignment layer was formed each on the upper plate and the lower plate by the same procedure as in Comparative Example 3, except that the liquid crystal alignment agent prepared in Example 2 was used instead of the liquid crystal alignment agent of Example 1 used in Comparative Example 3.

Test Example: Evaluation of Characteristics of Liquid Crystal Alignment Layers (a Photo-Alignment Layer and a Rubbing Alignment Layer)

<Preparation of a Liquid Crystal Cell>

Onto the liquid crystal alignment layer of a lower plate on which a liquid crystal alignment layer was formed according to Examples 1 to 8 and Comparative Examples 1 to 4, a sealing agent in which ball spacers having a size of 3 μm were impregnated was coated into a jar shape through EzROBO-3 of IEI (Iwashita Engineering Inc.). At this time, the sealing agent could be coated so as to have a thickness of 1 to 2 mm after bonding. Then, the liquid crystal alignment layers formed on the upper plate and the lower plate were arranged so as to face each other, the upper plate and the lower plate were bonded by using a press apparatus (BS-7220), and a UV light was irradiated between the upper plate and the lower plate to cure the sealing agent, thereby producing an empty cell. Then, the liquid crystal was injected into the empty cell by using a liquid crystal injecting device capable of vacuum-injecting a liquid crystal into a liquid crystal cell. Next, a sealing agent was coated onto the inlet of the liquid crystal-injected cell, and cured by irradiation with UV light, thereby producing a liquid crystal cell.

<Evaluation of Characteristics of Liquid Crystal Alignment Layer>

(1) Evaluation of Imidization Ratio

After coated with a liquid crystal alignment agent during the preparation of the liquid crystal alignment layer, an IR spectrum on the coating layer pre-sintered for 100 seconds on a hot plate of 70° C. and an IR spectrum on the coating layer sintered (cured) for 1000 seconds on a hot plate of 230° C. were obtained. Then, the areas of N—H peaks appeared on the band around 1540 cm$^{-1}$ in the IR spectra were compared, and the ratio reduced after sintered at 230° C., which was defined as the imidization ratio. The ratios were calculated and shown in Table 1.

(2) Evaluation of a Proper Exposure Amount

In the preparation of the liquid crystal alignment layer, a minimum exposure amount required to align a layer obtained by coating with a liquid crystal alignment agent was measured and shown as a proper exposure amount in Table 1. The results of the measurement of the proper exposure amount showed that those using the polymer prepared according to Examples exhibited a better aligning property even in a less exposure amount as compared with those using the polymer prepared according to Comparative Examples.

(3) Evaluation of Liquid Crystal Aligning Property

To the upper plate and the lower plate of a liquid crystal cell produced in the same method as above, a polarizing plate was attached perpendicularly to each other. Then, the polarizing plate-attached liquid crystal cell was placed on a backlight having a brightness of 7,000 cd/m$^2$ and any light well was observed with the naked eye. As a result of the observation, in Table 1, 'O' was marked when it looked dark without passing light through the liquid crystal cell, and 'X' was marked when a flow trace of liquid crystal or a light well such as bright spot was observed.

(4) Evaluation on the Luminance Variation Rate after Driving at High Temperature The aligning stability of liquid crystal was evaluated using the polarizing plate-attached liquid crystal cell which has been prepared for the above (3) Evaluation of liquid crystal aligning property.

Specifically, the polarizing plate-attached liquid crystal cell was placed on a backlight of 7,000 cd/m$^2$ and luminance at the black state was measured by using RP-880 equipment which is luminance measuring equipment. Then, the liquid crystal cell was driven for 24 hours at 60° C. by applying a voltage of 12 V at 60 Hz. Thereafter, the voltage of the liquid crystal cell was turned off and luminance at the black state was measured in the same manner as described above.

The difference between the initial luminance (L0) before driving and the late luminance (L) after driving was divided by the initial luminance (L0) and multiplied by 100 to give the luminance variation rate. As the luminance variation rate became nearer to 0%, the aligning stability becomes better. The luminance variation rates thus calculated were described in Table 1 below.

TABLE 1

|  | Imidization ratio [%] | Proper exposure amount | Liquid cell aligning property | luminance variation rate [%] |
| --- | --- | --- | --- | --- |
| Example 1 | 78 | 0.1~1.0 J/cm$^2$ | O | 2 |
| Example 2 | 81 |  | O | 7 |
| Example 3 | 88 |  | O | 4 |

TABLE 1-continued

| | Imidization ratio [%] | Proper exposure amount | Liquid cell aligning property | luminance variation rate [%] |
|---|---|---|---|---|
| Example 4 | 92 | | ○ | 8 |
| Example 5 | 75 | | ○ | 24 |
| Example 6 | 79 | | ○ | 41 |
| Example 7 | 73 | | ○ | 25 |
| Example 8 | 77 | | ○ | 41 |
| Comparative Example 1 | 50 | 1.0~2.0 J/cm² | ○ | 86 |
| Comparative Example 2 | 60 | 0.75~1.0 J/cm² | ○ | 44 |
| Comparative Example 3 | 78 | — | ○ | 73 |
| Comparative Example 4 | 81 | — | ○ | 65 |

The invention claimed is:

1. A method for preparing a photo-alignment layer, comprising the steps of preparing a polymer by reacting a diamine represented by the following Chemical Formula 1 with at least one tetracarboxylic acid or its anhydride; preparing a liquid crystal alignment agent by dissolving or dispersing said polymer in an organic solvent; and coating said liquid crystal alignment agent onto a substrate, and then subjecting to i) a sintering after an irradiation with light, or ii) a sintering during an irradiation with light, or iii) an irradiation with light after a sintering, wherein the photo-alignment layer exhibits a luminance variation rate of 41% or less represented by the following Equation 1:

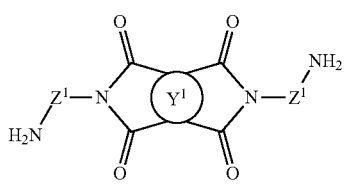

[Chemical Formula 1]

in the Chemical Formula 1, $Y^1$ is a tetravalent organic group derived from cyclic hydrocarbons having 4 to 8 carbon atoms, or a tetravalent organic group derived from compounds in which two or more of said cyclic hydrocarbons are linked by a single bond, —O—, —$CR^1R^2$—, —CO—, —CONH—, —COO—, —S—, —$SO_2$— or a combination thereof, or a tetravalent organic group in which one or more hydrogens in said tetravalent organic group are substituted with an alkyl group having 1 to 3 carbon atoms, with a proviso that $Y^1$ is not a tetravalent organic group derived from unsubstituted cyclobutane, wherein $R^1$ and $R^2$ is each independently hydrogen, an alkyl group having 1 to 10 carbon atoms, or a fluoroalkyl group having 1 to 10 carbon atoms, each of $Z^1$ is independently a divalent organic group represented by the following Chemical Formula 2,

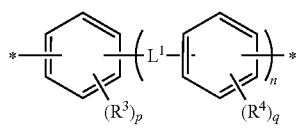

[Chemical Formula 2]

in the Chemical Formula 2, $R^3$ and $R^4$ are each independently a halogen, a cyano group, an alkenyl group having 2 to 10 carbon atoms, an alkyl group having 1 to 10 carbon atoms, an alkoxy group having 1 to 10 carbon atoms or a fluoroalkyl group having 1 to 10 carbon atoms, p and q are each independently an integer between 0 and 4, $L^1$ is a single bond, —O—, —CO—, —S—, —$SO_2$—, —$C(CH_3)_2$—, —$C(CF_3)_2$—, —CONH—, —COO—, —$(CH_2)_a$—, —$O(CH_2)_aO$—, —$OCH_2$—$C(CH_3)_2$—$CH_2O$— or —COO—$(CH_2)_a$—OCO—, wherein a is an integer between 1 to 10, and n is an integer between 0 and 3, Luminance variation rate (%)=(|L0−L1|)/L0*100    [Equation 1]

in the Equation 1,

L0 is an initial luminance wherein luminance at the black state is measured using a luminance measurement apparatus, after arranging two liquid crystal alignment layers so as to face each other, sealing their edges excluding an inlet so as to be spaced 1-2 mm apart from each other, injecting a liquid crystal and sealing the inlet to produce a liquid crystal cell, then attaching a polarizing plate to both sides of the liquid crystal cell so as to be perpendicular to each other, and attaching the polarizing plate to a backlight of 7,000 cd/m², and L1 is a late luminance wherein luminance at the black state is measured in the same manner as in the method of measuring L0, after driving the liquid crystal cell at 60° C. for 24 hours by applying a voltage of 12V at 60 Hz, and then turning off the voltage of the liquid crystal cell.

2. The method for preparing a photo-alignment layer according to claim 1, wherein $Y^1$ in Chemical Formula 1 is a tetravalent organic group derived from 1-methylcyclobutane, dimethylcyclobutane, 1,2,3,4-tetramethylcyclobutane, cyclopentane, 1-methylcyclopentane, cyclohexane, 1-methylcyclohexane, benzene, diphenyl ether, biphenyl, benzophenone, 2,2-diphenylpropane, diphenylsulfone or perfluoropropane-2,2-diyl dibenzene.

3. The method for preparing a photo-alignment layer according to claim 1, wherein $Y^1$ in Chemical Formula 1 is a tetravalent organic group derived from dimethylcyclobutane or 1,2,3,4-tetramethylcyclobutane.

4. The method for preparing a photo-alignment layer according to claim 1, wherein $Z^1$ in Chemical Formula 1 is a phenylene group or a biphenyldiyl group.

5. The method for preparing a photo-alignment layer according to claim 1, wherein the diamine represented by Chemical Formula 1 is at least one compound selected from the following Chemical Formulae 1a to 1d:

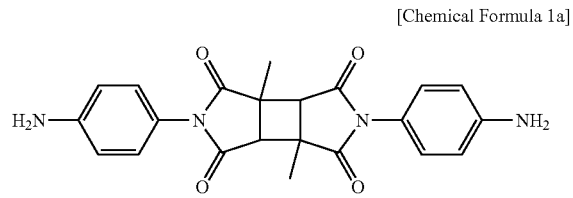

[Chemical Formula 1a]

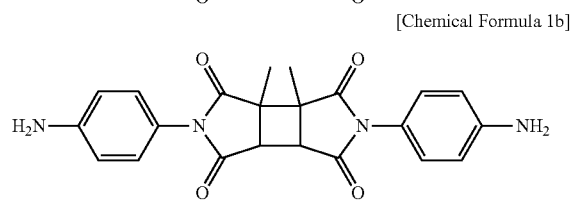

[Chemical Formula 1b]

-continued

[Chemical Formula 1c]

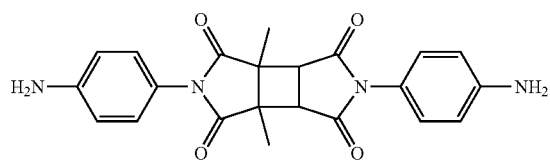

[Chemical Formula 1d]

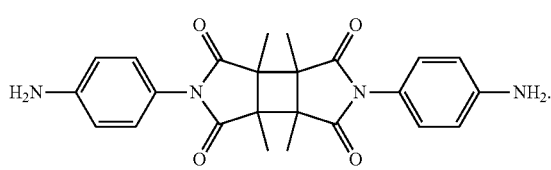

6. The method for preparing a photo-alignment layer according to claim 1, wherein a tetracarboxylic acid or its anhydride of the following Chemical Formula 3 is used as the tetracarboxylic acid or its anhydride:

[Chemical Formula 3]

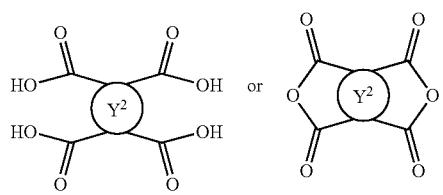

in the Chemical Formula 3, $Y^2$ is a tetravalent organic group derived from cyclic hydrocarbons having 4 to 8 carbon atoms, or a tetravalent organic group derived from compounds in which two or more of said cyclic hydrocarbons are linked by a single bond, —O—, —$CR^1R^2$—, —CO—, —CONH—, —COO—, —S—, —$SO_2$— or a combination thereof, or a tetravalent organic group in which one or more hydrogens in the tetravalent organic group are substituted with an alkyl group having 1 to 3 carbon atoms, wherein $R^1$ and $R^2$ is each independently hydrogen, an alkyl group having 1 to 10 carbon atoms or a fluoroalkyl group having 1 to 10 carbon atoms.

7. The method for preparing a photo-alignment layer according to claim 6, wherein $Y^2$ in Chemical Formula 3 is a tetravalent organic group having the following structure:

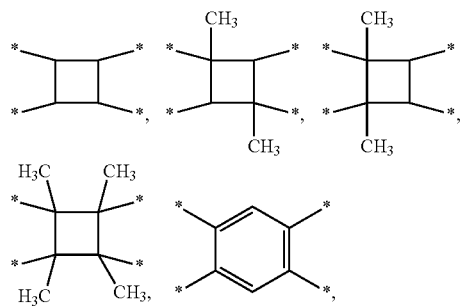

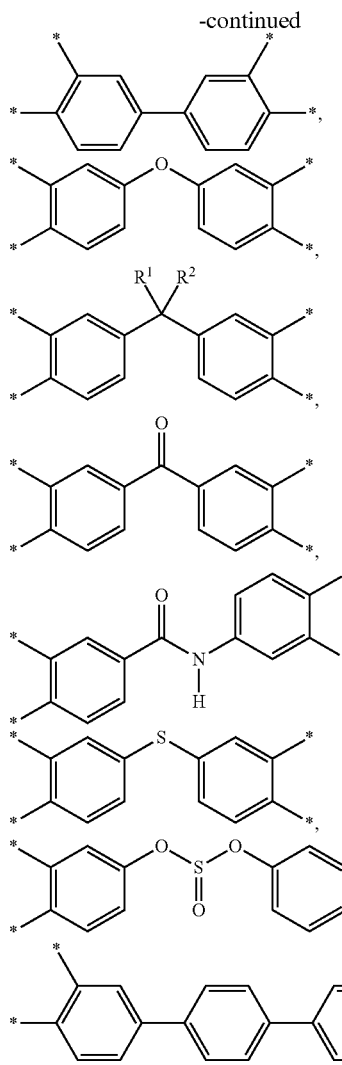

wherein $R^1$ and $R^2$ are each independently hydrogen, an alkyl group having 1 to 10 carbon atoms or a fluoroalkyl group having 1 to 10 carbon atoms.

8. The method for preparing a photo-alignment layer according to claim 1, wherein, through the step of preparing the polymer, a polymer containing a repeating unit of the following Chemical Formula 4 is prepared:

[Chemical Formula 4]

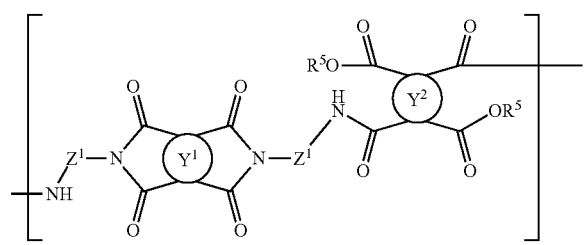

in the Chemical Formula 4, $Y^1$ and $Y^2$ are each independently a tetravalent organic group derived from cyclic hydrocarbons having 4 to 8 carbon atoms, or a tetravalent organic group derived from compounds in which two or more of said cyclic hydrocarbons are linked by a single bond, —O—, —CR$^1$R$^2$—, —CO—, —CONH—, —COO—, —S—, —SO$_2$— or a combination thereof, or a tetravalent organic group in which one or more hydrogens in the tetravalent organic group are substituted with an alkyl group having 1 to 3 carbon atoms, with a proviso that Y$^1$ is not a tetravalent organic group derived from unsubstituted cyclobutane, wherein R$^1$ and R$^2$ is each independently hydrogen, an alkyl group having 1 to 10 carbon atoms or a fluoroalkyl group having 1 to 10 carbon atoms, each of Z$^1$ is independently a divalent organic group represented by the following Chemical Formula 2,

[Chemical Formula 2]

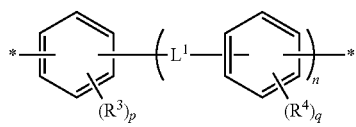

in the Chemical Formula 2,

R$^3$ and R$^4$ are each independently a halogen, a cyano group, an alkenyl group having 2 to 10 carbon atoms, an alkyl group having 1 to 10 carbon atoms, an alkoxy group having 1 to 10 carbon atoms or a fluoroalkyl group having 1 to 10 carbon atoms, p and q are each independently an integer between 0 and 4, L$^1$ is a single bond, —O—, —CO—, —S—, —SO$_2$—, —C(CH$_3$)$_2$—, —C(CF$_3$)$_2$—, —CONH—, —COO—, —(CH$_2$)$_a$—, —O(CH$_2$)$_a$O—, —OCH$_2$—C(CH$_3$)$_2$—CH$_2$O— or —COO—(CH$_2$)$_a$—OCO—, wherein a is an integer between 1 and 10, n is an integer between 0 and 3, and each of R$^5$ is independently hydrogen or an alkyl group having 1 to 10 carbon atoms.

9. The method for preparing a photo-alignment layer according to claim 1, wherein, in the step of preparing the polymer, a diamine represented by the following Chemical Formula 5 is additionally used:

H$_2$N—Z$^1$—NH$_2$  [Chemical Formula 5]

in the Chemical Formula 5, each of Z$^1$ is independently a divalent organic group represented by the following Chemical Formula 2,

[Chemical Formula 2]

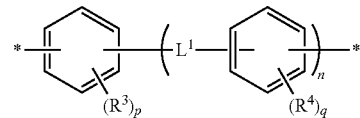

in the Chemical Formula 2,

R$^3$ and R$^4$ are each independently a halogen, a cyano group, an alkenyl group having 2 to 10 carbon atoms, an alkyl group having 1 to 10 carbon atoms, an alkoxy group having 1 to 10 carbon atoms or a fluoroalkyl group having 1 to 10 carbon atoms, p and q are each independently an integer between 0 and 4, L$^1$ is a single bond, —O—, —CO—, —S—, —SO$_2$—, —C(CH$_3$)$_2$—, —C(CF$_3$)$_2$—, —CONH—, —COO—, —(CH$_2$)$_a$—, —O(CH$_2$)$_a$O—, —OCH$_2$—C(CH$_3$)$_2$—CH$_2$O— or —COO—(CH$_2$)$_a$—OCO—, wherein a is an integer between 1 and 10, and n is an integer between 0 and 3.

10. The method for preparing a photo-alignment layer according to claim 9, wherein, through the step of preparing the polymer, a polymer containing a repeating unit of the following Chemical Formula 6 is prepared:

[Chemical Formula 6]

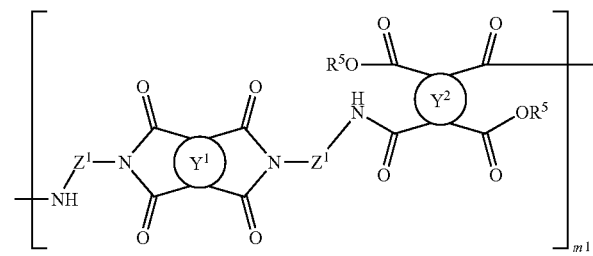

in the Chemical Formula 6, Y$^1$ and Y$^2$ are each independently a tetravalent organic group derived from cyclic hydrocarbons having 4 to 8 carbon atoms, or a tetravalent organic group derived from compounds in which two or more of said cyclic hydrocarbons are linked by a single bond, —O—, —CR$^1$R$^2$—, —CO—, —CONH—, —COO—, —S—, —SO$_2$— or a combination thereof, or a tetravalent organic group in which one or more hydrogens in said tetravalent organic group are substituted with an alkyl group having 1 to 3 carbon atoms, with a proviso that Y$^1$ is not a tetravalent organic group derived from unsubstituted cyclobutane, wherein R$^1$ and R$^2$ is each independently hydrogen, an alkyl group having 1 to 10 carbon atoms or a fluoroalkyl group having 1 to 10 carbon atoms, each of Z$^1$ is independently a divalent organic group represented by the following Chemical Formula 2, ii) a sintering during an irradiation with light, or iii) an irradiation with light after a sintering:

[Chemical Formula 1]

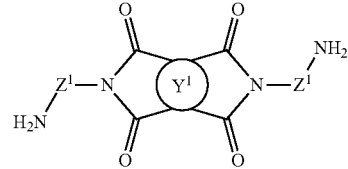

in the Chemical Formula 1,
$Y^1$ is a tetravalent organic group derived from cyclic hydrocarbons having 4 to 8 carbon atoms, or a tetravalent organic group derived from compounds in which two or more of said cyclic hydrocarbons are linked by a single bond, —O—, —CR$^1$R$^2$—, —CO—, —CONH—, —COO—, —S—, —SO$_2$— or a combination thereof, or a tetravalent organic group in which one or more hydrogens in said tetravalent organic group are substituted with an alkyl group having 1 to 3 carbon atoms, with a proviso that $Y^1$ is not a tetravalent organic group derived from unsubstituted cyclobutane,
wherein $R^1$ and $R^2$ is each independently hydrogen, an alkyl group having 1 to 10 carbon atoms or a fluoroalkyl group having 1 to 10 carbon atoms,
$Z^1$ is each independently a divalent organic group represented by the following Chemical Formula 2,

[Chemical Formula 2]

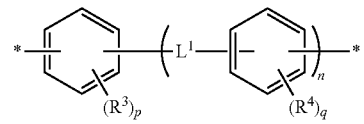

in the Chemical Formula 2,
$R^3$ and $R^4$ are each independently a halogen, a cyano group, an alkenyl group having 2 to 10 carbon atoms, an alkyl group having 1 to 10 carbon atoms, an alkoxy group having 1 to 10 carbon atoms or a fluoroalkyl group having 1 to 10 carbon atoms,
p and q are each independently an integer between 0 and 4,
$L^1$ is a single bond, —O—, —CO—, —S—, —SO$_2$—, —C(CH$_3$)$_2$—, —C(CF$_3$)$_2$—, —CONH—, —COO—, —(CH$_2$)$_a$—, —O(CH$_2$)$_a$O—, —OCH$_2$—C(CH$_3$)$_2$—CH$_2$O— or —COO—(CH$_2$)$_a$—OCO—, wherein a is an integer between 1 and 10,
n is an integer between 0 and 3.

[Chemical Formula 2]

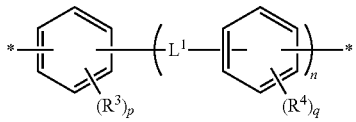

in the Chemical Formula 2,
$R^3$ and $R^4$ are each independently a halogen, a cyano group, an alkenyl group having 2 to 10 carbon atoms, an alkyl group having 1 to 10 carbon atoms, an alkoxy group having 1 to 10 carbon atoms or a fluoroalkyl group having 1 to 10 carbon atoms,
p and q are each independently an integer between 0 and 4,
$L^1$ is a single bond, —O—, —CO—, —S—, —SO$_2$—, —C(CH$_3$)$_2$—, —C(CF$_3$)$_2$—, —CONH—, —COO—, —(CH$_2$)$_a$—, —O(CH$_2$)$_a$O—, —OCH$_2$—C(CH$_3$)$_2$—CH$_2$O— or —COO—(CH$_2$)$_a$—OCO—, wherein a is an integer between 1 and 10,
n is an integer between 0 and 3,
$R^5$ is hydrogen or an alkyl group having 1 to 10 carbon atoms, and
m1 and m2 are each independently an integer of 1 to 500 as the repeating number of the corresponding repeating unit.

11. The method for preparing a photo-alignment layer according to claim 1, wherein, in the step of preparing said polymer, the diamine represented by Chemical Formula 1 is used alone; 1,2-bis(p-aminophenoxy)ethane is used together with the diamine represented by Chemical Formula 1; or at least one co-diamine selected from a group consisting of 4,4'-oxydianiline and bis(p-aminophenoxy)methane is used together with the diamine represented by Chemical Formula 1, wherein said co-diamine is used in an amount of 1 to 40 mol % based on the total diamine.

12. The method for preparing a photo-alignment layer according to claim 1, wherein, through the step of preparing the polymer, a polymer with a weight average molecular weight of 1,000 to 200,000 g/mol is prepared.

13. The method for preparing a photo-alignment layer according to claim 1, wherein, in the step of irradiating with light, the light is irradiated in an amount of light exposure of 0.01 to 5 J/cm$^2$.

14. A method for preparing a photo-alignment layer, comprising the steps of preparing a polymer by reacting a diamine represented by the following Chemical Formula 1 with at least one tetracarboxylic acid or its anhydride; preparing a liquid crystal alignment agent by dissolving or dispersing said polymer in an organic solvent; and coating said liquid crystal alignment agent onto a substrate, and then subjecting to i) a sintering after an irradiation with light, or

* * * * *